Nov. 29, 1949  E. RYDER  2,489,821
BICYCLE ATTACHMENT
Filed May 14, 1945  2 Sheets-Sheet 1
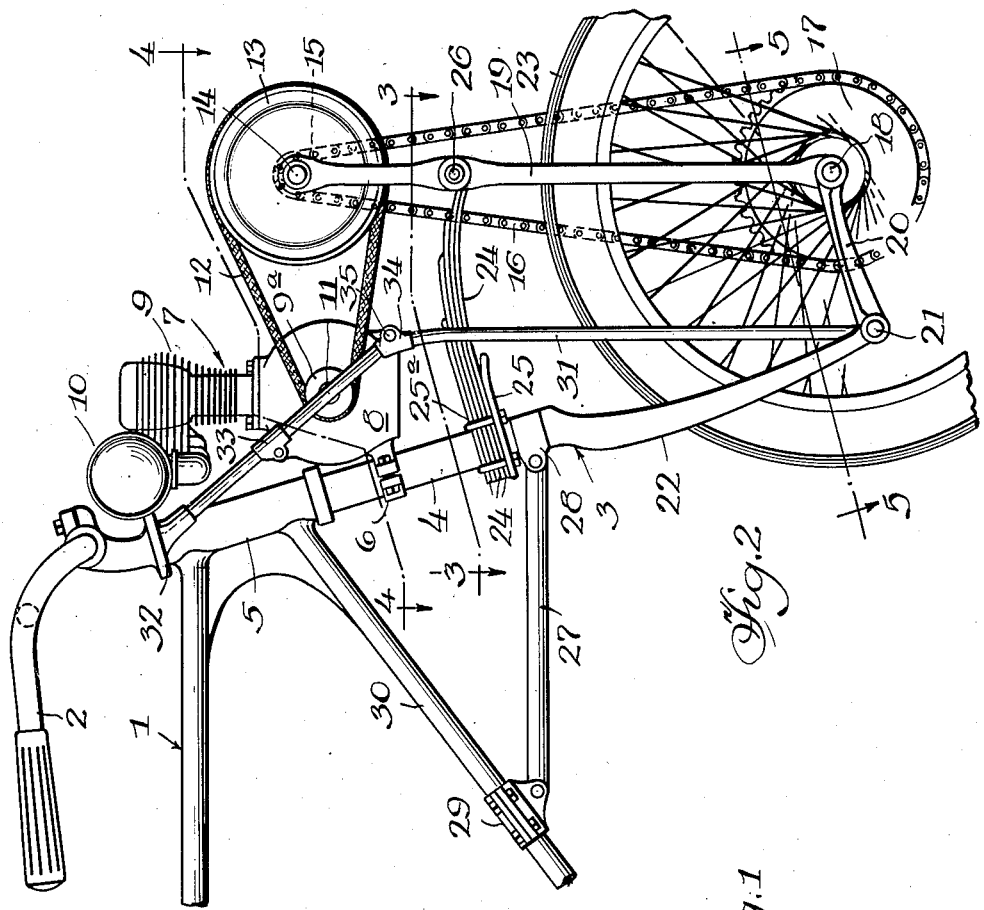
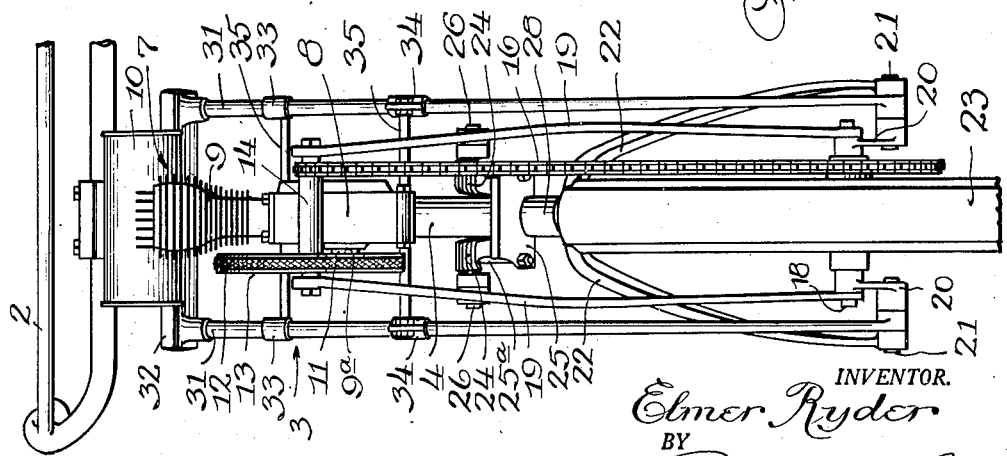
INVENTOR.
Elmer Ryder
BY
Parkinson & Lenz
Attys.

Nov. 29, 1949     E. RYDER     2,489,821
BICYCLE ATTACHMENT

Filed May 14, 1945     2 Sheets-Sheet 2

INVENTOR.
Elmer Ryder
BY
Parkinson Lane
Attys

Patented Nov. 29, 1949

2,489,821

UNITED STATES PATENT OFFICE 2,489,821

BICYCLE ATTACHMENT

Elmer Ryder, Berwyn, Ill.

Application May 14, 1945, Serial No. 593,658

3 Claims. (Cl. 180—33)

The present invention relates to a novel attachment providing motive power for a bicycle.

Among the objects of the present invention is the provision of a novel power unit attachment for the usual front wheel and fork assembly of a bicycle.

A further object of the present invention is the provision of a novel power unit assembly and flexible mounting therefor whereby the front wheel may oscillate up and down over road bumps and the drive from the power unit accommodates itself to shock.

The invention further comprehends a novel power driven front wheel and fork assembly adapted to be substituted for the usual front wheel and fork assembly of a bicycle to thereby convert the bicycle into a motor drive.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawings, and while there is shown therein a preferred embodiment, it is to be understood that the same is susceptible of modification and change, and comprehends other details, arrangements of parts, features and constructions without departing from the spirit of the invention.

In the drawings:

Figure 1 is fragmentary front view of a bicycle equipped with the novel power unit attachment.

Figure 2 is a fragmentary view in side elevation of the front part of a bicycle frame upon which the present invention is shown mounted for converting the bicycle into a motor drive.

Figure 3:
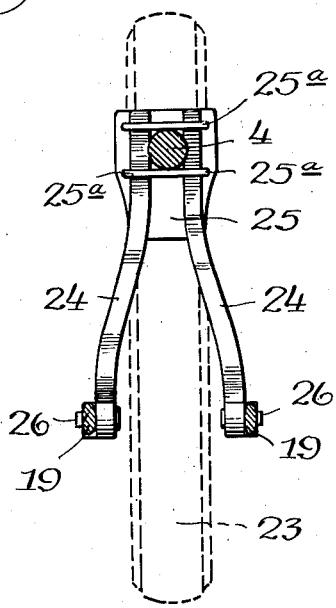
Figure 3 is a view in horizontal cross section taken on the line 3—3 of Figure 2.
Figure 4:
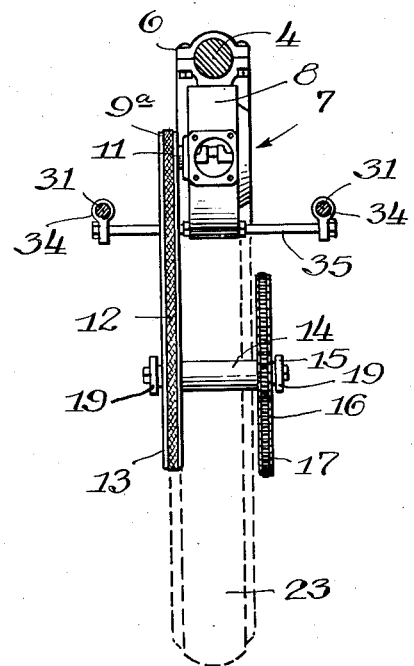
Figure 4 is a view in horizontal cross section taken on the irregular line 4—4 of Figure 2.
Figure 5:
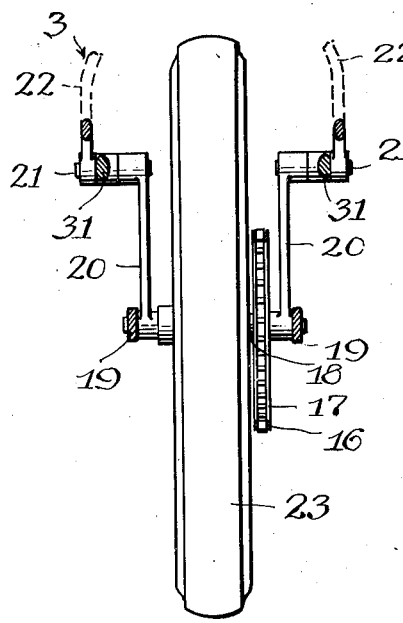
Figure 5 is a cross sectional view taken in a plane represented by the line 5—5 of Figure 2.

Referring more particularly to the illustrative embodiment shown in the drawings, the novel attachment is shown as substituted for the front wheel and fork assembly of a bicycle having a frame 1 and handle bars 2. This attachment comprises a fork assembly 3 having an upper end or standard 4 pivotally mounted in the collar or crown 5 provided at the forward end of the frame. Rigidly mounted on the standard of the fork by means of a bracket 6 is a motor or power unit 7 provided with a crank case 8, cylinder 9 and fuel tank 10. The crank shaft 11 is shwn as provided with a pulley wheel 9a driving a belt 12 passing over a large pulley wheel 13 on a stub shaft 14. Also mounted on this stub shaft is a sprocket 15 over which passes a chain 16 rotating a sprocket wheel 17 fixed upon a stub shaft 18. This stub shaft 18 as well as the stub shaft 14 are shown as mounted at the opposite ends of spaced brace rods 19 and with the stub shaft 18 carried upon the forward end of arms or links 20 each pivotally mounted at 21 upon the lower ends of the bifurcations of the fork 22.

As stated above, the standard 4 is rotatably mounted within the crown or collar 5 at the forward end of the frame 1. In order to mount the front wheel 23 and its associated parts so as to give it flexibility to oscillate up and down over road bumps and to also accommodate the drive mechanism or power take-off to road shock, a spring mounting or construction comprising spaced leaf springs 24 mounted at their rear end upon the standard 4 by means of a plate or bracket 25 and anchoring straps 25a and with their forward end connected by means of the pins 26 to the spaced brace rods 19 disposed at the opposite sides of the wheel. This spring construction gives the desired flexibility to the mounting, power take-off and drive wheel 23.

Because the usual fork and front wheel assembly of bicycle cannot generally withstand the strain imposed upon it by the motor drive, the invention comprehends the provision of an auxiliary brace or supporting means 27 connected at its forward end by a collar 28 encompassing but permitting rotation of the standard 4 and at its rear end provided with a split bracket 29 encompassing the frame tube or support 30 of the bicycle frame. By this construction and arrangement, the bicycle frame is relieved of the strain which would normally be imposed upon it by the front fork assembly carrying the power unit, power take-off and associated drive mechanism.

To further support the power unit assembly, brace rods 31 are provided at the opposite sides of the crank case with their upper ends supported in a cross head 32 and their lower ends supported upon the stub shaft 21. Each rod is provided with spaced brackets 33 and 34 carrying cross pins 35 supporting at spaced points the crank case 8. These brackets 33, 34, cross pins 35 and bracket 6 provide a rigid assembly for mounting the motor or power unit in operative position. Any suitable controls for the power drive may be provided, such as those commonly used upon the handle bars of a motorcycle or the like.

Having thus disclosed my invention, I claim:

1. A power unit attachment for a bicycle provided with the usual frame, said unit including a fork assembly having spaced depending fork arms, a front wheel having an axle, a pair of parallel links each pivotally connected at one end to one of the fork arms, respectively, and at the other end to said axle, an engine rigidly and fixedly connected to and supported by said fork assembly above said front wheel and provided with a drive pulley, a power take-off including a countershaft located forwardly of said engine and having a driven pulley and a driving sprocket mounted thereon, a belt connecting the drive pulley of said engine with said driven pulley, said driving sprocket being drivably connected with said driven pulley, a driven sprocket mounted on said axle for driving said wheel, a drive chain interconnecting said sprockets, a leaf spring anchored at one end to said fork assembly and extending forwardly therefrom for resiliently mounting the power take-off, and link means interconnecting said axle with said countershaft whereby to maintain a predetermined center-to-center distance therebetween, the free end of said leaf spring being connected with said link means to provide a flexible mounting for supporting the axle and front wheel and the power take-off from the engine.

2. A power unit for converting a standard bicycle into a power driven cycle, comprising an attachment including a motor, a fork assembly for the bicycle frame, means for immovably mounting the motor upon the fork assembly, a power take-off from the motor and disposed forwardly thereof, a drive wheel, means for driving the wheel from the power take-off, supporting bars connecting the spindle of the wheel to the power take-off, a spring mounting having an end connected to the fork assembly and the other end pivotally mounted upon the supporting bars intermediate their lengths and thereat resiliently carrying these bars, power take-off and wheel whereby they may oscillate up and down over road bumps and to accommodate the power take-off to road shock, and spaced arms linking the ends of the fork assembly to the spindle of the wheel.

3. A power unit for converting a standard bicycle into a power driven cycle, comprising an attachment including a motor, a fork assembly for the bicycle frame, means for immovably mounting the motor upon the fork assembly, a power take-off from the motor and movable relative thereto, a drive wheel, means for driving the wheel from the power take-off, upright members connecting the spindle of the wheel to the power take-off with the power take-off journalled in the upper end and the drive wheel journalled in the lower end of said members, a spring mounting having an end connected to the fork assembly and the other end pivotally mounted upon said members and flexibly carrying said members, power take-off and drive wheel, and spaced arms pivotally mounted at one end to the fork assembly and carrying at their other end the spindle of the wheel.

ELMER RYDER.

REFERENCES CITED

The following references are of record in the file of this patent:

UNITED STATES PATENTS

| Number | Name | Date |
|---|---|---|
| 1,052,829 | Karminski et al. | Feb. 11, 1913 |
| 1,132,829 | Cobb | Mar. 23, 1915 |
| 1,203,927 | Stagni | Nov. 7, 1916 |

FOREIGN PATENTS

| Number | Country | Date |
|---|---|---|
| 10,318 | Great Britain | 1912 |
| 102,363 | Austria | Jan. 25, 1926 |
| 527,402 | France | July 25, 1921 |
| 696,225 | Germany | Sept. 14, 1940 |